United States Patent
El-Ibiary

(10) Patent No.: US 7,413,054 B2
(45) Date of Patent: Aug. 19, 2008

(54) OIL CIRCULATION RETENTION SYSTEM AND METHOD

(75) Inventor: Yehia El-Ibiary, Simpsonville, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 695 days.

(21) Appl. No.: 10/909,990

(22) Filed: Aug. 3, 2004

(65) Prior Publication Data

US 2006/0054404 A1    Mar. 16, 2006

(51) Int. Cl.
*F01M 5/00*    (2006.01)
(52) U.S. Cl. ............ 184/6.22; 384/392; 384/399
(58) Field of Classification Search ............ 184/7.4, 184/6.22; 384/388, 392, 399, 400
See application file for complete search history.

(56) References Cited

U.S. PATENT DOCUMENTS

| 3,906,717 | A | * | 9/1975 | Matthews | 60/39.08 |
| 3,960,245 | A | * | 6/1976 | Weinrich | 184/6.16 |
| 5,733,048 | A |   | 3/1998 | El-Ibiary et al. | 384/399 |
| 6,230,680 | B1 | * | 5/2001 | Pirone | 123/196 R |
| 6,264,003 | B1 | * | 7/2001 | Dong et al. | 184/104.1 |
| 6,374,950 | B1 | * | 4/2002 | Takeno | 184/7.4 |
| 2002/0046905 | A1 | * | 4/2002 | Hulkkonen et al. | 184/6.1 |
| 2006/0054404 | A1 | * | 3/2006 | El-Ibiary | 184/6 |

OTHER PUBLICATIONS

"The New Dodge® Oil Level and Filtration System," Dodge/Reliance Magazine, vol. 14, pp. 22-23 (2002), *available at* http://www.dodge-reliance.com/literature/magazine/volume14.htm.

* cited by examiner

*Primary Examiner*—David M Fenstermacher
(74) *Attorney, Agent, or Firm*—Thompson Coburn LLP

(57) ABSTRACT

A bearing lubrication (oil circulation) system having a check valve configuration for preventing overflow of an oil reservoir or tank. The pressurized oil circulation system may comprise a pump that pressurizes oil from the tank and circulates the oil through a supply conduit to a bearing, and returns the oil to the tank through a return conduit. The system may include a check valve disposed in the supply conduit and a pilot-operated check valve disposed in the return conduit. The pilot may be taken from the supply conduit upstream of the check valve disposed on the supply conduit. When pressure is discharged from the oil circulation, such as with shutdown of a circulation pump, the check valves automatically close and thus prevent oil contained in the supply and return conduits from draining (i.e., by gravity) to the oil tank. Therefore, flooding of the oil tank with excessive oil is prevented. Furthermore, loss of oil from the bearing sump is also prevented.

17 Claims, 4 Drawing Sheets

OIL CIRCULATION RETENTION SYSTEM AND METHOD

BACKGROUND OF THE INVENTION

The present invention relates generally to the field of bearings and the lubrication of such bearings. More particularly, the invention relates to a novel arrangement for retaining lubricant in a bearing lubrication system upon shutdown of the system.

Wide varieties of bearings and other power transmission components are available and are currently in use throughout a range of industrial applications. Bearings are generally used for facilitation of rotational movement in a mechanical application, and typically include a plurality of bearing elements situated in a housing. Depending upon the application and the anticipated loading, the bearing elements may be journal bearings, needle bearings, roller bearings, ball bearings, and so forth. Moreover, lubrication of the bearings generally prolongs the useful life by reducing corrosion and wear, and by providing for sealing and cooling of the bearing.

Lubrication may reduce friction between components and between a bearing and a rotating shaft, such as through the formation of a thin film of lubricant between the components. Lubrication may also reduce friction between the bearing elements, for example, between inner and outer rings or races. The lubrication may also aid in carrying away contaminants or small debris which may find their way into the bearing or which may be released from the component parts over time, and may serve to substantially preclude the ingress of contaminants (e.g., dirt, debris, moisture and so forth) into the bearing. As for the type of lubricant, bearings may be lubricated with grease, oil, a solid lubricant, and so forth, with the choice depending on factors such as the temperature range, operating speeds, loading conditions, economics, and the like. Moreover, lubricants may be changed from time to time because their properties may deteriorate as a result of aging and contamination of the lubricants. As for oil lubrication systems, the various system types may include an oil bath, dripping oil, circulating oil, oil jet, oil mist, and so forth.

Employment of a circulating oil system, though potentially increasing initial investment costs compared to greased systems and other oil systems, is generally an effective means of removing heat from a bearing by providing an adequate continuous flow of cool, clean oil, and offers advantages including improved dissipation of heat and effective flushing of contaminants, such as dirt, dust, moisture and wear metals. In general, a circulating oil system may take a lubricant, such as mineral oil, from a tank or other source, and pump the oil through supply piping to one or more bearings, and return the oil through return piping to the tank. Pumping of the oil may be accomplished, for example, with a positive displacement pump, such as a gear pump, which may be coupled to the oil source (e.g., oil tank). Exemplary piping elements in the supply and return piping may include tubing and tubing connections, carbon steel and stainless steel piping, screwed and flanged piping connections, other fittings, flow devices, and the like.

Further, circulating oil systems may employ a variety of features, such as instrumentation (e.g., pressure and temperature indication), filtration, thermal processing, and so forth. Filtration (e.g., installed in the supply line) may be utilized to maintain the lubricant in a useable condition for a longer period of time, and to reduce the amount of contaminants introduced (or re-introduced) to the bearing elements. Additionally, thermal processing through the use of a heat exchanger, for example, may control the temperature of the oil or lubricant to prevent thermal damage to the lubricant, the rotating shaft and/or the bearing elements. In sum, circulating oil systems may vary widely as to detail, the particulars of each design depending on the make, size, type, location and purpose of the oil system and lubricated bearing. Moreover, system and equipment design may depend on factors, such as projects economics, operating conditions, design standards, and so forth.

For instance, the size of an oil reservoir or tank, which may range from a few gallons to several thousand gallons, may be based on a variety of design and operating factors of the circulating oil system. The tank capacity may be based on the volume or rate of the oil circulated. For example, the tank capacity in gallons may be designed to equal a factor (e.g., 5-10 times) the gallons of oil circulated per minute. In another example, the tank capacity may be sized to provide a minimum retention time (e.g., 2-5 minutes) between the pump suction and the minimum operating level in the tank. Many other examples of design bases for the size of the oil tank or reservoir exist in the art. Moreover, to reduce the number of different product offerings, manufacturers and users may standardize on one size of reservoirs which may hold more, or in some cases considerably less oil, than the volume in circulation between the system and the serviced bearings.

A special case is where the tank capacity is sized to accommodate draining of the oil from the supply and return piping (upon shutdown of the oil circulation pump, for example). In other words, the tank capacity may be sized to exceed the volume of the supply and return piping, and thus exceed the volume of oil contained in the piping in a hydraulically full system. However, for long runs of supply and return piping, the designed tank size may increase to the point where the layout or handling of the tank becomes cumbersome (e.g., difficult to install on a small skid unit), or where the cost of the tank becomes prohibitive. Furthermore, design of a tank capacity based on the piping volume is not applicable where the piping layout is not known prior to the design and fabrication of the oil tank. Accordingly, other means are needed to accommodate the oil in the piping and to prevent, for example, overflow of the oil tank when the oil circulation pump is shutdown and the oil in the supply/return piping drains (i.e., by gravity) back to the tank.

For tanks with a relatively small volume or a high normal operating level (small vapor space), the oil that drains from the piping may overfill the tank, especially with long runs of supply and return piping. As the tank overfills, the oil may leak from the tank (e.g., through the tank breather) and may create an oil flood on the surrounding ground or floor, as well as cause loss of oil in the total system. Such loss can lead to emptying of the tank and bearing sump, which can then adversely affect the operation of the pump and the bearings. As indicated, increasing the size of the oil tank significantly such that any oil flowing back will not cause over filling of the tank requires prior knowledge of the size and length of the connecting pipes, which is often not available. Moreover, even where the piping data is available, the size of the tank may become cumbersome or cost prohibitive, and requires multiple product offerings. Also, it should be noted that it may be desirable to avoid draining of oil from the piping and bearing even if the tank is large enough to accommodate the system oil. For example, instead of draining oil from the piping and bearing to the tank, it may be beneficial to maintain the oil in the bearing sump or housing for static lubrication so that the bearing may continue to operate while the oil circulation is shutdown.

There is a need, therefore, for an improved technique for circulating lubricating oil through a bearing, while effectively managing the shutdown of the system. In particular, there is a need for an improved technique to accommodate the oil contained in the supply and return piping upon depressuring of the oil circuit (e.g., shutdown of the circulation pump) to prevent overflow of the oil source (tank). Also, there is a need to retain the oil in the bearing housing to provide for static lubrication upon shutdown of the oil circulation.

SUMMARY OF THE INVENTION

The present invention provides a novel technique for a bearing oil circulation system to respond to such needs. The technique utilizes check valves in the oil circuit to prevent draining of oil to the oil tank and thus prevents overflow of the tank. A check valve situated in the oil supply piping (pump outlet to the bearing) requires a certain threshold inlet pressure to open. This threshold pressure on the supply piping also opens a pilot-operated check valve situated in the return piping. The return check valve generally requires the same or less pressure to open than that needed to open the supply check valve. As the pump is shut down and the pump outlet pressure decays, the pump outlet (supply) check valve and the return pilot-operated check valve both automatically close, preventing oil in the supply and return lines from draining to the oil system tank. Thus, the problem of oil tank overflow is mitigated without the expensive and cumbersome option of installing a larger oil tank. In addition, the oil level may be maintained in the bearing housing to provide static lubrication so that the bearing may continue to operate.

In one embodiment, a bearing lubrication system includes a pump configured to extract lubricant from a tank and to pressurize and deliver the lubricant through a discharge of the pump. A supply conduit is coupled to the discharge of the pump and to a point of lubrication, and a return conduit is coupled to the bearing and to the tank. The pump circulates the lubricant through the supply conduit, the lubricated component, and the return conduit back to the tank. A check valve is disposed in the supply conduit, and a pilot-operated check valve is disposed in the return conduit. Pilot pressure is taken from the supply conduit upstream of the check valve disposed on the supply conduit.

In another embodiment, a lubricant circulation system includes a pressure source configured to take lubricant from a lubricant source and to deliver the lubricant through a pressure line. The pressure line includes a check valve and is configured to route the lubricant to a bearing or gear reducer. A return line includes a pilot-operated check valve and is configured to route the lubricant from the bearing or gear reducer to the lubricant source. In this example, the combine volume of the pressure line and return line is greater than the normal liquid-empty process volume of the lubricant source.

In yet another embodiment, a method for supplying lubricant to a bearing includes pressurizing a supply line with oil, opening a supply check valve and a return pilot-operated check valve, and circulating oil through a bearing or gear reducer. Further, the supply line may be depressured, and the supply check valve and a return pilot-operated check valve automatically close to prevent draining of oil to the oil source.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
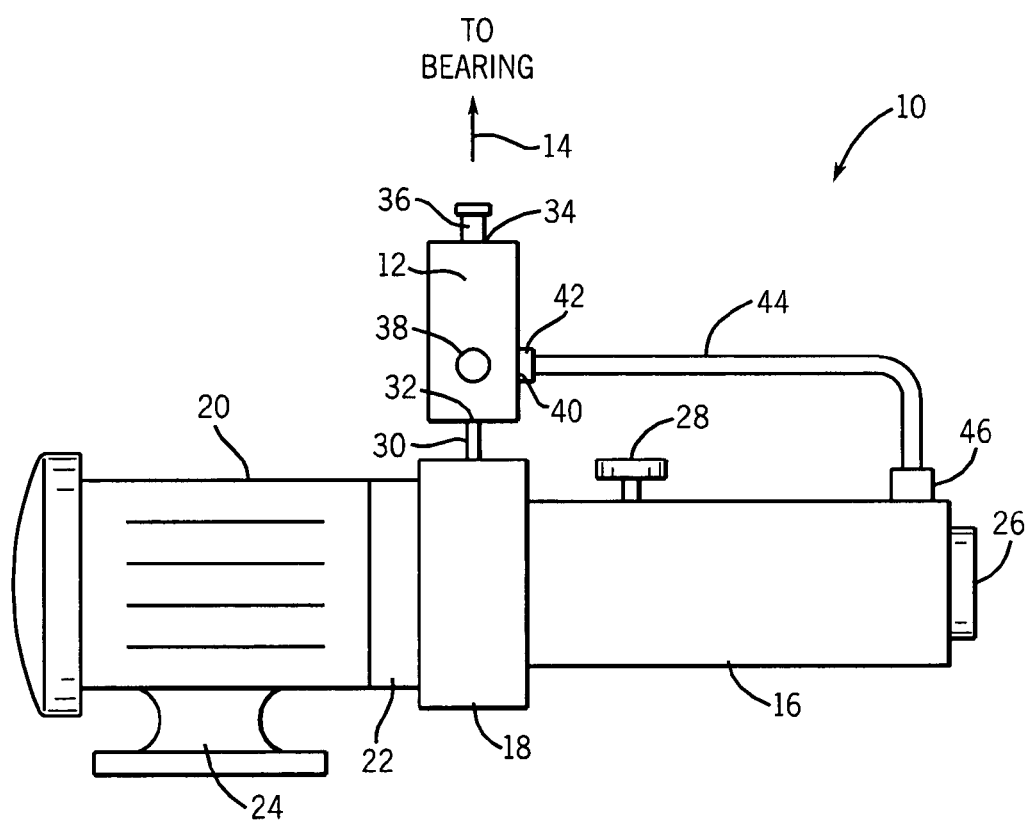
FIG. 1 is a diagrammatical representation of an exemplary lubrication unit according to one embodiment of the invention.

Turning now to the drawings and referring to FIG. 1, a bearing lubrication unit 10 is shown. In this illustrated embodiment, the bearing lubrication unit 10 is a pumped oil circulation unit, and includes an anti-flooding or oil-retention block 12, which may comprise a manifold for mounting cartridge valves including check valves. In particular, as discussed below, the oil-retention block 12 may comprise a supply check valve, a return check valve, and a relief valve. In general, the bearing lubrication unit 10 provides an oil supply 14 from an oil tank 16 via pump 18 and through a supply conduit to one or more bearings or gear reducers or other mechanical components. In this example, an oil pump motor 20 is close-coupled to the oil pump 18 via a C-face adapter 22. A motor support 24 is positioned under motor 20 to support the motor 20 and pump 18 assembly.

A level element or indicator, such as a sight glass 26, measures the level of lubrication oil (e.g., a light mineral oil) in the oil tank 16. It should be apparent that a variety of local or remote level indicators may be employed. Moreover, a relief device, such as a tank vent or tank breather 28, may be mounted on the oil tank 16 to prevent overpressure and/or excessive vacuum conditions in the oil tank 16. Further, the oil tank 16 may be cylindrical, spherical, rectangular, or irregular in shape, and may include a low point drain, dip stick, access hole for cleanout and inspection, and so forth. Additionally, the oil tank 16 may be equipped with a heater, such as an immersion type electric oil heater to heat the oil during initial startup or as necessary to maintain the normal operating temperature in cold climates, for example. Such an oil heater may be protected by a low oil level switch in the oil reservoir.

The oil-retention block 12 may be installed relatively close to the oil tank 16 and the pump 18. In the illustrated example, pump discharge piping 30 couples the oil-retention block 12 to the discharge of pump 18. The discharge piping 30 is routed from the pump 18 discharge (e.g., pump 18 discharge flange) to the inlet port 32 on the oil-retention block 12. The piping connection at the inlet port 32 may be screwed, threaded, flanged, a tubing connection, and the like. With the oil-retention block 12 coupled to the pump 18, the oil from tank 16 may be pumped via pump 18 through discharge piping 30 to the inlet port 32, and through the oil-retention block 12 having the supply check valve as described below.

The oil supply may then exit the oil-retention block 12 through the discharge port 34 and discharge flange 36, in this example. The size of the flange 36, as well as other piping components in the system, may vary depending on the bearing cooling requirements, properties of the circulating oil, the circulation rate of the oil, and so forth. Moreover, other types of connections or fittings, such as a screwed fitting, tubing fitting, and the like, may be utilized at the block 12 discharge in lieu of flange 36.

Further, an oil filter (e.g., 10 microns or greater) may be included at or near the discharge of the block 12 to filter the oil supply 14 to the bearing, and thus remove contaminates, such as dirt, scale, etc. from the oil to prevent damage to the bearing and oil system components. A bypass line having a check valve, for example, may permit flow in cases where the filter is fouled, plugged, or collapsed. Other configurations may include two oil filters with one operating and one on standby, and with appropriate valving for switching filters. Moreover, in certain applications, the oil supply piping downstream of the filter may be stainless steel to avoid the formation of scale or rust, whereas the oil return piping downstream of the bearing may be more typically carbon steel.

Return oil enters the oil-retention block 12 at inlet port 38 and travels through the block 12, including the return pilot-operated check valve as described below. As with other system connections, the piping or tubing connection at inlet port 38 may include a variety of different types of fittings, flanges, etc. The oil exits the oil-retention block 12 through discharge port 40 and discharge fitting 42, and flows through the oil return line 44 and tank fitting 46 into the oil tank 16. Again, such conduits and connections may be of various types. Moreover, if a cooler, such as conventional shell and tube heat exchanger, is installed, the cooler may be situated on the return line 44. Such coolers may employ water as a cooling medium, which may be routed through the tube side for ease of cleaning. Also, the oil pressure in the oil cooler may be operated higher than the cooling water pressure to reduce the potential that water will leak into the oil side. Where coolers are employed, other cooler types, such as forced air radiators, and so forth, may of course be used.

Figure 2:
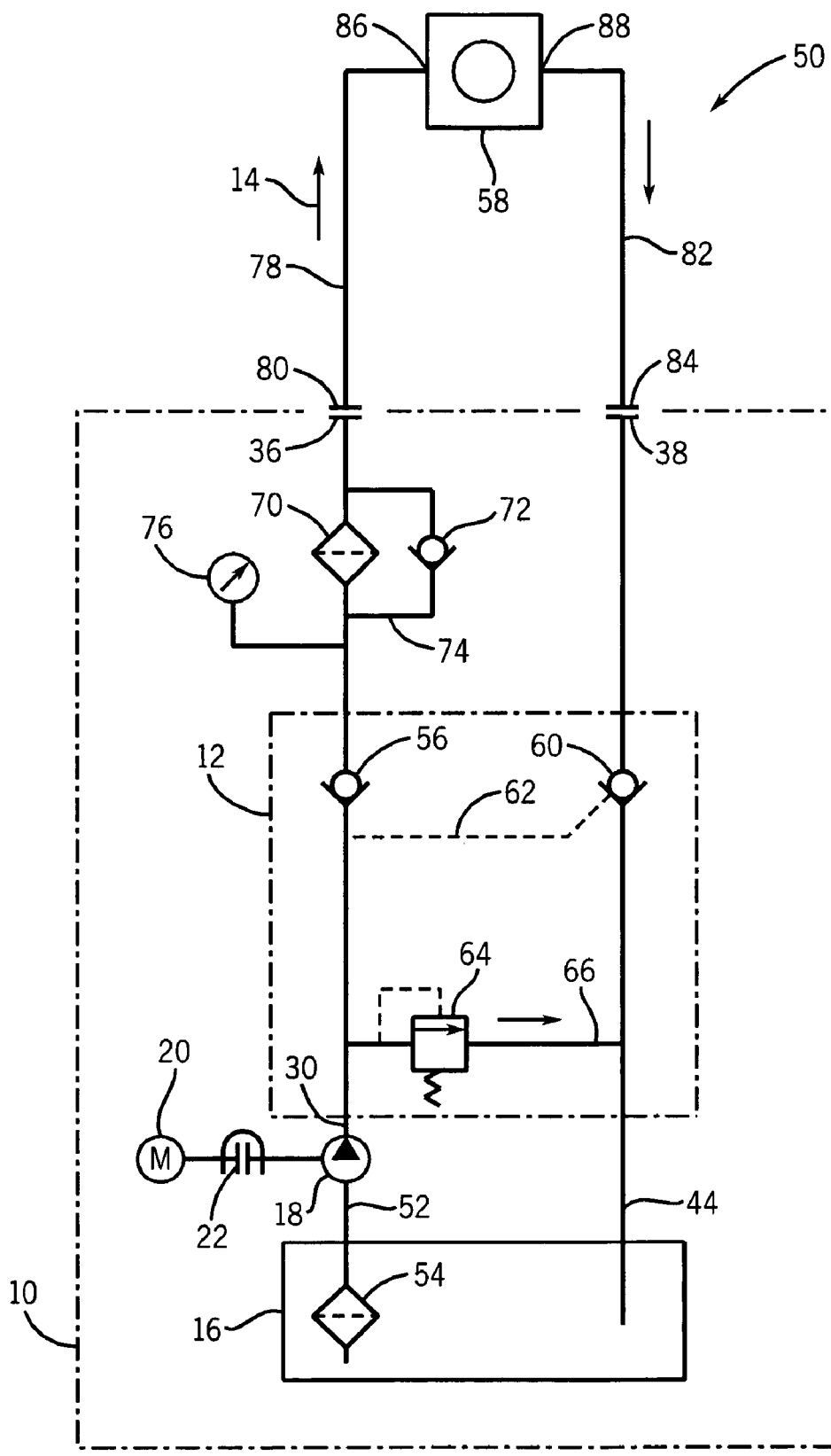
FIG. 2 is a an exemplary schematic diagram of the lubrication system of FIG. 1.

Referring to FIG. 2, a hydraulic schematic diagram of a bearing lubrication system 50 that utilizes the bearing lubrication unit 10 having oil-retention block 12 of FIG. 1 is shown. The oil supply pump 18 draws oil from oil tank 16 via pump suction 52. A suction strainer 54 may be installed on the pump suction 52 piping, for example, to protect the pump 18 from large debris. The oil discharges from pump 18 through pump discharge piping 30 and enters the oil-retention block 12. With the pump 18 in operation, the discharge side of the pump is under positive pressure due to the head delivered by the pump and due to the hydraulic resistance of the oil circuit. The check valve 56 opens as the inlet pressure to the check valve exceeds a threshold value. Also, downstream of the bearing 58, the return check valve 60 opens by positive pressure via pilot line 62 exceeding a threshold value. With the pump 18 in operation and both check valves 56 and 60 automatically opened, oil flows from the pump 18 through the bearing 58 and returns to the oil tank 16.

To protect the oil circuit from overpressure, a pressure relief valve 64 may be installed on the pump 18 discharge piping, inside or outside of the oil-retention block 12. In the illustrated embodiment, relief valve 64 is installed within the oil-retention block 12. The discharge of the relief valve ties into the return line 44 to the oil tank 16. In an alternate example, the relief valve 64 may discharge through a dedicated discharge line to the oil tank 16. Moreover, pressure may be controlled, (i.e., maintained) in the oil supply header by a back pressure regulator, for example, which returns a portion of the pump output back to the oil tank 16, allowing for the required oil flow and pressure to pass onto the bearing, gear reducer, or other lubricated components.

Additionally, as mentioned, the oil supply to the bearing 58 may be sent through a filter 70 to remove contaminants from the oil. In the illustrated embodiment, a bypass check valve 72 on a bypass line 74 permits flow to the bearing 58 in situations, for example, where the filter 70 is fouled. The filter 70 is typically designed for less pressure drop or hydraulic resistance than that through check valve 72 so that the oil supply will flow primarily through filter 70 during normal operation. Finally, remote or local pressure indication may be installed upstream of filter 70 to indicate the performance of the filter, such as when the filter is fouled, partially or fully. In the illustrated embodiment, a local pressure gauge 76 is shown installed upstream of the filter 70.

The oil exits the bearing lubrication unit 10 via discharge flange 36, which is connected to flange 78 on the oil supply line 80. Again, a variety of connection types, such as tubing fittings or screwed pipe, for example, may be used in lieu of flanges 36 and 78. The oil supply line 80 then attaches to the bearing 58 at inlet connection 82. The oil exits at an outlet connection 84, which ties to oil return line 86. The inlet and outlet connections 82 and 84 may be oriented at various locations around bearing 58, and may also include a variety of connection types. Finally, a flange 88 from the oil return line 86 ties into the lubrication unit 10 at flange 38. It should be reiterated that a variety of processing steps may be implemented on the oil supply upstream of the bearing 58 and on the oil return downstream of the bearing 58. For example, as discussed, a filter may be installed to filter the oil, or a heat exchanger may be installed to cool the oil. It should also be noted that while a single bearing is illustrated a number of components may be serviced by the circulating system.

Figure 3:
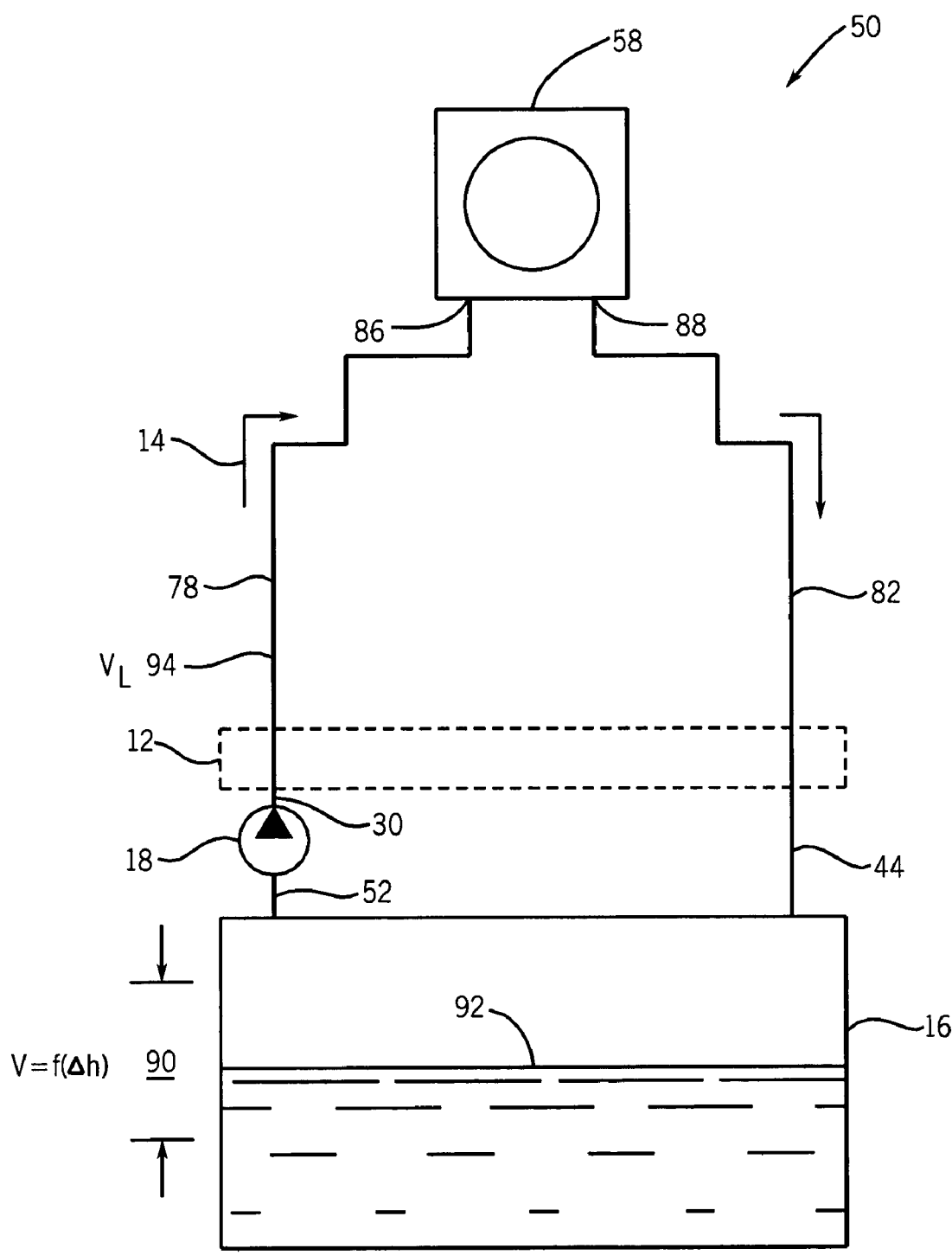
FIG. 3 is a hydraulic diagrammatical representation of a lubrication system tank and piping illustrating volumes in which lubricant is circulated and from which flooding is avoided by the present technique.

FIG. 3 is a hydraulic diagrammatical representation of the bearing lubrication system 50 of FIG. 2, and is used to compare the available volume in the tank 16 versus the combined volume of the other system components. The volume V of liquid in the tank 16 is shown as a function of the change in height, $\Delta h$ 90, of the liquid level 92 in the oil tank 16. The available volume, or volume $V_{TV}$ of the tank 16 vapor space, is also a function of the change in the height, $\Delta h$ 90, of the liquid level 92. The combined volume $V_L$ 94 encompasses the volume in the remaining oil system components elevated above the oil tank 16, and includes the process volume of the bearing 58, the supply piping 78, and the return piping 82. Generally, the volume in the supply and return piping contributes most of the combined volume $V_L$ 94.

A problem, as discussed, is when the pump 18 is shut down, oil circulation stops and the pump discharge piping is depressurized. If no oil-retention block 12 is installed, the volume $V_L$ 94 of oil (in a hydraulically full system) would drain by gravity to the oil tank 16, overfilling the tank. In particular, without an oil-retention block 12, oil would flow back through the supply piping 78 into the tank 16, and oil would drain in the normal flow path through the return piping 82 into the tank 16. Even if the pump 18 is operating, but malfunctioning, for example, if the weight of the oil in the supply piping 78 exceeds the pump 18 discharge pressure, the oil in the supply piping 78 would flow back through the pump 18 into the tank 16, and oil in the return piping 83 would also flow into the tank 16. Whether the pump 18 is shutdown or generating inadequate pump head (or discharge pressure), the tank 16 would thus overflow in many applications where the volume $V_L$ 94, exceeds the volume $V_{TV}$. As the supply and return lines would empty into the tank 16, the change in height $\Delta h$ 90 of the liquid level 92 in the oil tank 16 would increase, the level 92 extenually exceeding the height of the tank 16. Oil would thus overflow from the tank 16 to the ground (e.g., through the tank breather 28), contaminating the area surrounding the tank.

This is especially problematic where the oil supply line 78 and the return line 82 are relatively long, giving a volume $V_L$ 94 that is relatively large and significantly greater than the volume $V_T$ of the tank 16, or at least greater than the volume $V_{TV}$ of the vapor space in the tank 16 (i.e., the volume above the liquid level 92). Therefore, backflow of oil ($V_L$ 94) from the system piping and components, in this context, without the oil-retention block 12 would overwhelm the tank 16. However, with the oil-retention block 12 having the supply and return check valves, the oil ($V_L$ 94) is prevented from draining back to the tank 16, and thus the tank 16 does not overflow when the pump 18 and lubrication system 50 are shut down. Also, the bearing housing is not starved of oil upon loss of circulation.

Figure 4:
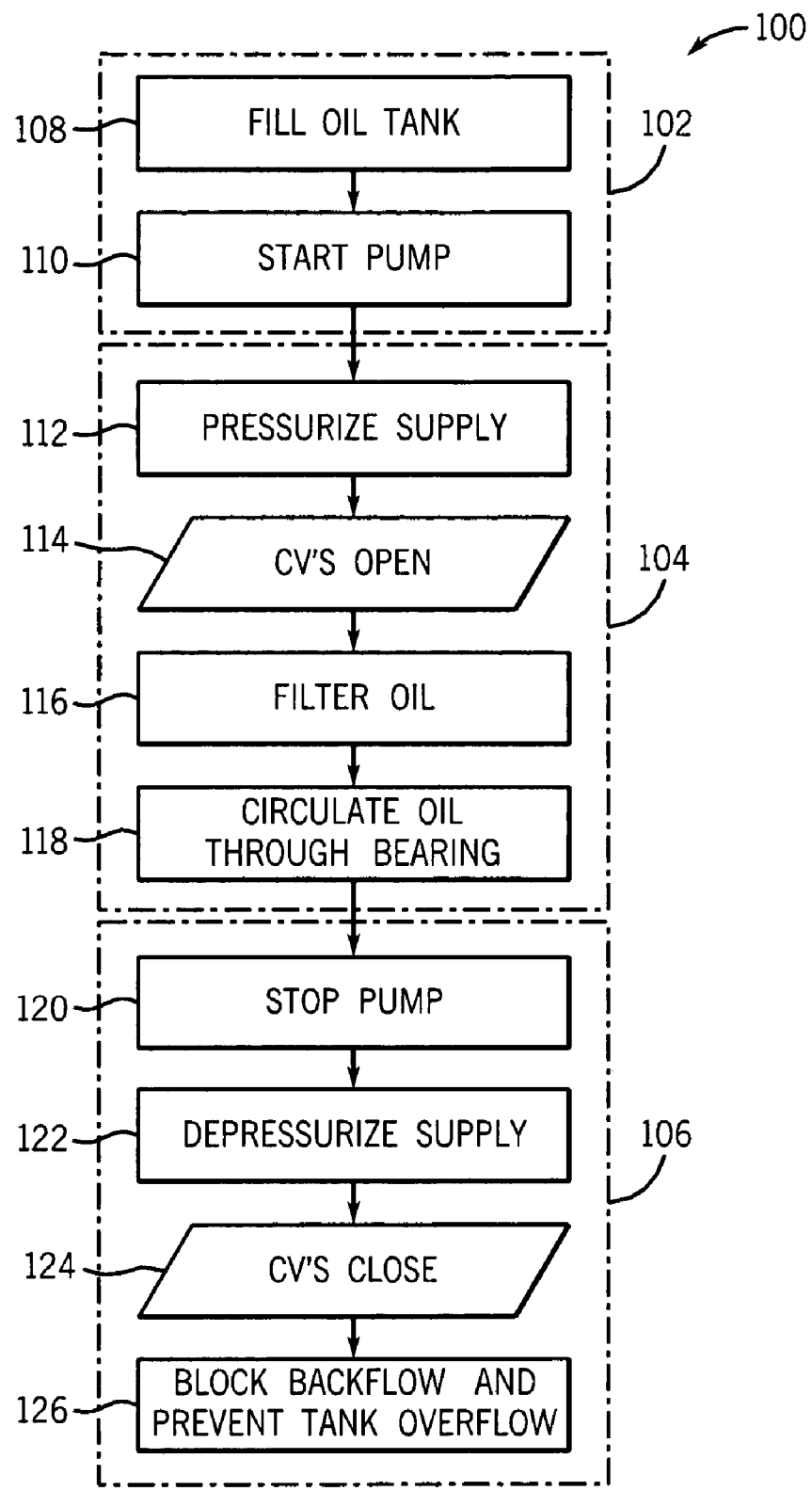
FIG. 4 is a block diagram of an exemplary method for operating an oil circulation system of the type illustrated in the foregoing figures.

Referring to FIG. 4, a method 100 for operating a bearing oil circulation system, such as the bearing lubrication system 50 of FIG. 2, is depicted. The method 100 encompasses three phases of operation, including startup 102, normal operation 104, and shutdown 106. During startup 102 of the oil circulation system, the oil supply reservoir or tank may need to be filled, especially if the circulation system was previously de-inventoried. After filling the oil tank to the appropriate level (block 108), the circulation pump, such as pump 18, may be started (block 110). As the oil from the oil tank fills the system, more oil may need to be added to the oil tank (block 108), and air in the system may be displaced, for example, through the oil tank 16 and through breather 28.

During normal operation, the pump 18 pressurizes the oil in the supply piping (block 112) to deliver the oil to the bearing 58. This pressure in the supply piping opens the supply check valve and return check valve (via pilot line 62), as referenced in block 114, and the oil may then circulate through a filter (block 116) and through the bearing 54 (block 118). During shutdown 106 of the system 50, the pump 18 is stopped (block 120) and the supply piping is depressurized (block 122). With the oil supply depressurized, the supply check valve and the return check valve automatically close, as referenced in block 124. The closed check valves substantially prevent draining or backflow of oil from the supply and return piping (and other system components) into the tank 16 (block 126). Thus, the oil tank 16 does not overfill or overflow during shutdown of the pump 18 and system 50.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A bearing lubrication system comprising:
   a pump configured to extract lubricant from a tank and to pressurize and deliver the lubricant through a discharge of the pump;
   a supply conduit coupled to the discharge of the pump and to a point of lubrication;
   a return conduit coupled to the point of lubrication and to the tank,
   wherein the pump circulates the lubricant through the supply conduit, the point of lubrication, and the return conduit back to the tank;
   a check valve disposed in the supply conduit; and
   a pilot-operated check valve disposed in the return conduit, wherein pilot pressure is taken from the supply conduit upstream of the check valve disposed on the supply conduit.

2. The system of claim 1, wherein as the pump pressurizes the supply conduit beyond a threshold pressure value at the check valve, the check valve automatically opens to permit flow of the lubricant through the supply conduit, and the pilot-operated check valve automatically opens to permit flow of the lubricant through the return conduit.

3. The system of claim 1, wherein a combined volume of the supply conduit, a bearing sump, and the return conduit is greater than a volume of a vapor space above a normal liquid level in the tank.

4. The system of claim 1, wherein a combined volume of the supply conduit and the return conduit is greater than a volume of the tank.

5. The system of claim 1, wherein the check valve and pilot operated check valve prevent substantial drainage of lubricant from the point of lubrication during shutdown of the pump.

6. The system of claim 1, wherein the check valve and the pilot-operated check valve are disposed in an oil-retention block.

7. The system of claim 5, wherein the oil-retention block comprises a relief device disposed on the supply conduit upstream of the check valve.

8. The system of claim 1, wherein the check valve and the pilot-operated check valve are disposed in a manifold-mounted cartridge valve assembly.

9. The system of claim 1, wherein a relief device is disposed on the supply conduit upstream of the check valve and is configured to discharge to at least one of the return conduit and the tank.

10. The system of claim 1, further comprising a bearing or gear reducer coupled in series with the supply conduit and the return conduit.

11. The system of claim 10, wherein the check valve and the pilot-operated check valve are configured to prevent substantial loss of lubricant from a sump of the bearing or gear reducer.

12. The system of claim 1, further comprising a filter device disposed in the supply conduit.

13. A lubricant circulation system comprising:
    a pressure source configured to draw lubricant from a lubricant source and to deliver the lubricant through a pressure line;
    the pressure line comprising a check valve and configured to route the lubricant to a lubricated component; and
    a return line comprising a pilot-operated check valve and configured to route the lubricant from the lubricated component to the lubricant source,
    wherein a combined volume of the pressure line, return line, and a housing of the lubricated component is greater than an available volume of the lubricant source.

14. The system of claim 13, wherein the lubricant source comprises an oil tank and the lubricant comprises oil.

15. The system of claim 13, wherein pilot pressure for the pilot-operated check valve is taken from the pressure line upstream of the check valve disposed on the pressure line.

16. The system of claim 13, wherein the pressure source comprises a pump.

17. The system of claim 13, wherein the pump comprises a positive displacement pump.

* * * * *